March 4, 1969  T. BUDZICH  3,430,722
APPARATUS TO SYNCHRONIZE FLUID DRIVES WITH MECHANICAL DRIVES
Filed Sept. 28, 1967  Sheet 1 of 2
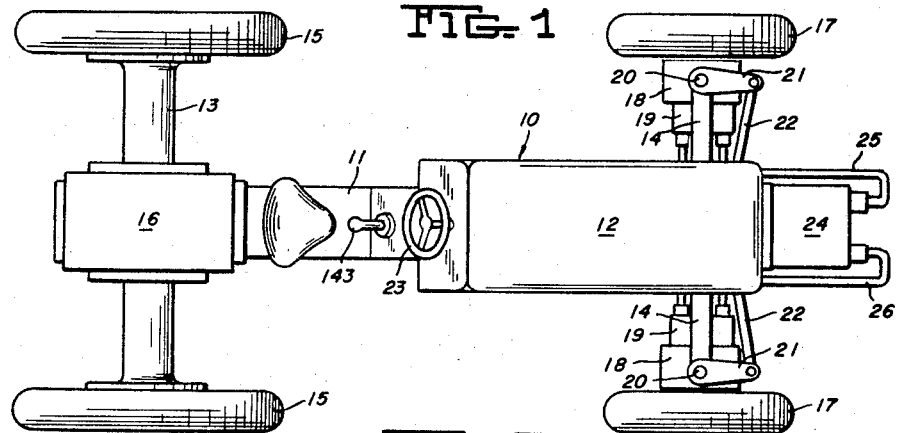
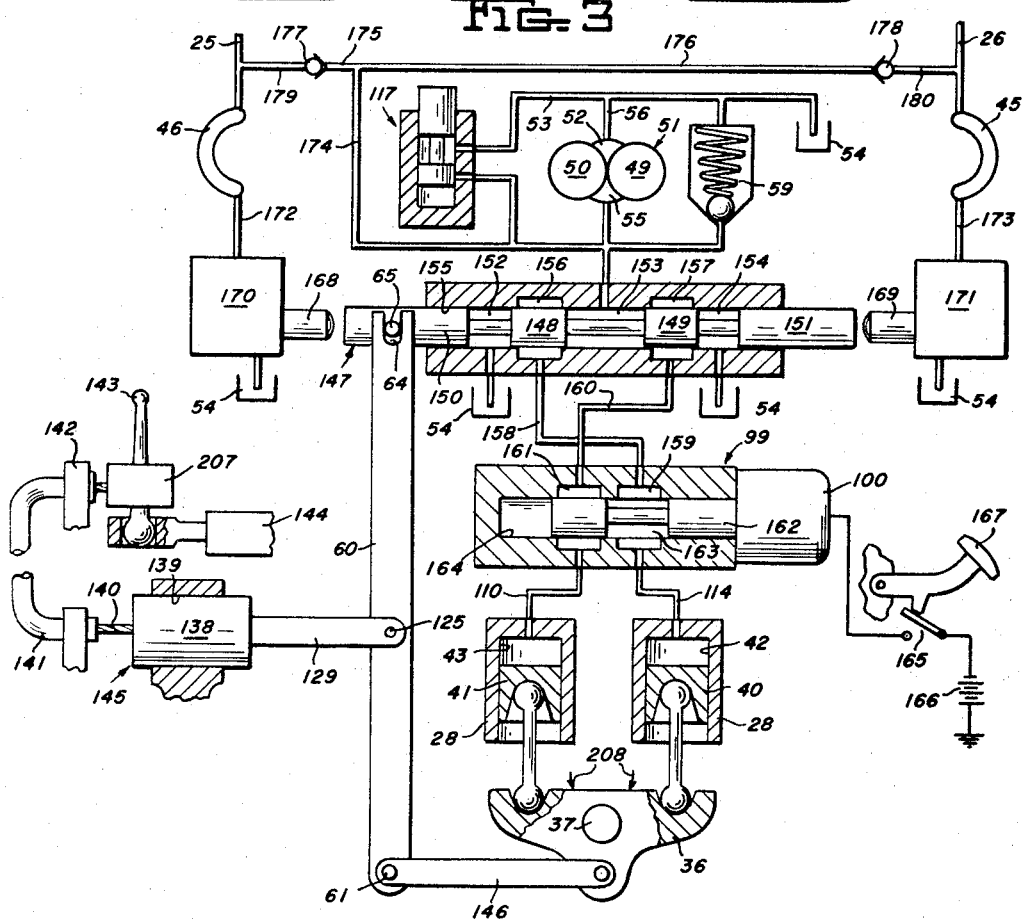
INVENTOR
TADEUSZ BUDZICH
By William H. Hogg
Attorney

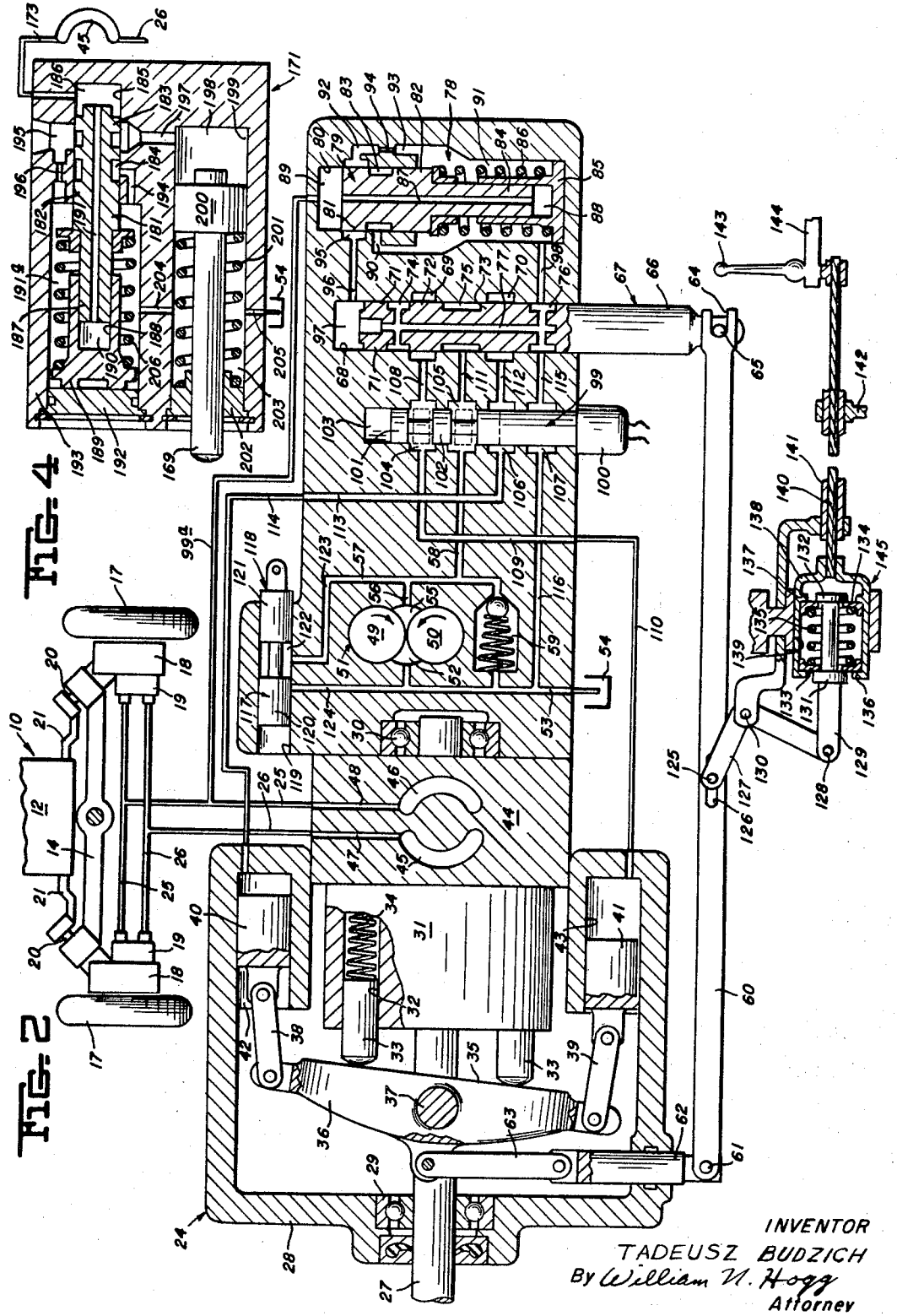

United States Patent Office 3,430,722
Patented Mar. 4, 1969

3,430,722
APPARATUS TO SYNCHRONIZE FLUID DRIVES WITH MECHANICAL DRIVES
Tadeusz Budzich, 80 Murwood Drive, Moreland Hills, Ohio
Continuation-in-part of application Ser. No. 500,050, Oct. 21, 1965. This application Sept. 28, 1967, Ser. No. 671,298
U.S. Cl. 180—44    29 Claims
Int. Cl. B60k 7/00, 17/30, 17/34

ABSTRACT OF THE DISCLOSURE

An auxiliary hydrostatic drive for a tractor or the like which incorporates a variable flow hydraulic pump and hydraulic motors. The hydraulic pump has a tiltable cam plate to vary the displacement of the pump. The control for the pump is provided which allows the cam plate to be set at plurality of control positions and limiting the maximum displacement of the pump. The control means includes a device for superimposing a system pressure control signal over the displacement control means so that a relatively constant discharge pressure can be maintained from the pump with the maximum displacement control positions being matched to and operable by the gear shift lever so that for each particular gear ratio a control position approximately matched to the speed of the vehicle will be provided with the pressure responsive control means operating between zero and the maximum selected displacement control position.

---

This application is a continuation-in-part of my application, Ser. No. 500,050 filed Oct. 21, 1965 and which has since become abandoned.

This invention relates generally to power drives of self-propelled vehicles and more particularly to front axle fluid power drives of tractors, self-propelled farm machinery and earth moving equipment.

In still more particular aspects this invention relates to front axle fluid power drives which are synchronized with the mechanical transmission by an automatic pressure responsive control over which a maximum pump displacement control for each gear ratio is superimposed.

Fluid drives employing a variable flow pump, equipped with an automatic pressure responsive flow control, will automatically synchronize the driving effort with that of the mechanical transmission. These automatic synchronization characteristics will be maintained as long as traction resistance at the wheels of the fluid drive fully contain the driving effort supplied to the wheels. However, on sudden loss of traction at any one of the wheels driven by the fluid transmission, the full potential energy of the fluid drive becomes instantaneously unloaded, resulting in very uneven traction effort characteristics and excessive tire wear. Slowing down of the response of the automatic pump control, in the direction of increase of the speed of the drive, is beneficial in ground with widely and rapidly varying traction characteristics, however, it suffers from the following disadvantages.

When working on ground surface with comparatively large soft patches, alternating with hard compact surface, the fluid drive, although stable, will still attain the maximum speed, going out of synchronization, which condition results in excessive tire wear. At the same time the maximum driving effort setting of the fluid drives becomes critical. The maximum speed potential of the fluid drive must be selected to cover the entire speed range of the vehicle. In low gear of the mechanical transmission, when the vehicle moves slowly, the above mentioned characteristics of going out of synchronization, with sudden reduction in traction coefficient, becomes especially troublesome since the difference between the speed attained by the unloaded fluid drive and the actual speed of the vehicle is great.

It is therefore a principal object of this invention to provide a maximum speed limit of a fluid drive on a vehicle for each particular gear ratio of the mechanical transmission of the vehicle.

Another object of this invention is to provide maximum displacement limiting control of the pump employed in a fluid drive of a vehicle, for each particular gear ratio of the mechanical transmission of the vehicle.

Still another object of this invention is to provide maximum displacement limiting control of the fluid drive pump of a vehicle, which is superimposed upon the automatic pressure responsive variable pump control, synchronizing the fluid drive with the vehicle mechanical drive.

A further object of this invention is to provide a maximum displacement limiting control of the fluid pump and a fluid drive of a vehicle which is synchronized with the gear shift lever of the mechanical transmission of the vehicle.

A still further object of this invention is to provide a maximum displacement limiting control in a fluid pump of a fluid drive for a vehicle which is synchronized with the gear shift lever of the mechincal transmission in both forward and reverse driving ranges of the vehicle.

A still further object of this invention is to provide maximum displacement limiting control of the fluid pump of the fluid drive of a vehicle, synchronized with the gear shift lever of the mechinical drive in forward and reverse driving ranges of the vehicle, while maintaining an automatic pressure responsive pump control up to this maximum displacement limit for synchronization of the fluid and mechanical drives.

A still further object of this invention is to provide a mechanism which will bring the pump displacement of a fluid drive of a vehicle into zero position with the gear shift lever of the mechanical transmission in neutral.

Further objects and advantages will become apparent from the following description taken in conjunction with the drawings in which:

FIGURE 1 is a plan view somewhat diagrammatic of a tractor showing the mounting of the fluid drive in this invention;

FIGURE 2 is a somewhat schematic representation of the fluid drive components of this invention with diagrammatically shown variable displacement pump and pump control components;

FIGURE 3 is a schematic representation of the control elements of FIGURE 2, modified to operate in both the forward and reverse speed ranges of the vehicle; and FIGURE 4 is a detail sectional view of a compensator override.

Although this invention has broader application, it will be described hereinafter in specific relation to a tractor, which presently constitutes the preferred use.

Referring now to the drawings and particularly to FIGURE 1, a tractor, generally designated as 10, is shown which includes a frame 11 mounting an engine 12, a back axle 13, and a front axle 14. Rear wheels 15 are mounted on back axle 13 and are drivingly connected with the engine 12 by a mechanical transmission 16. Steered front wheels 17 are provided each of which is equipped with a mechanical gear reducer 18, mounting fluid motors 19. Each combination of the front steered wheels 17, gear reducers 18 and fluid motors 19, is pivotally mounted by a king pin 20 in respect to front axle 14. A conventional steering arm 21, through a tie rod 22, connects the front steered wheels 17 to a tractor steering wheel 23.

A variable flow pump, generally designated as 24, is driven by the engine 12 and is connected through flexible ducts 25 and 26 to fluid motors 19. As shown in FIGURE 1, the variable flow pump 24 is directly mounted on the engine, although it can be mounted at any suitable power take-off.

Referring now to FIGURE 2, the variable flow pump 24 is connected through ducts 25 and 26 to the motors 19. The pump 24 includes a shaft 27, journalled in a pump housing 28, by bearings 29 and 30. The shaft 27 transmits rotary motion from the tractor engine, not shown, to a cylinder barrel 31, equipped with a plurality of cylinder bores 32, reciprocably mounting pistons 33. Piston return springs 34 are provided in the bores 32 and normally bias the pistons 33 into contact with reaction surface 35 of the trunnion 36. The trunnion 36 is mounted for limited rotation in respect to the pump housing 28 by trunnion pins 37. The trunnion 36 is operably connected through connecting rods 38 and 39, to control pistons 40 and 41 respectively, guided for reciprocation in bores 42 and 43 respectively, thereby constituting pressure responsive control means for controlling the angular inclination of the trunnion 36. The cylinder barrel 31 abuts a valve plate 44 (which is shown rotated through 90° for clarity of explanation). The valve plate 44 is equipped with a low pressure timing port 45 and a high pressure timing port 46. The ports 45 and 46 are connected respectively through passages 47 and 48 to ducts 26 and 25, respectively. Pump shaft 27 is drivingly connected through a drive linkage, not shown, with the gears 49 and 50 of a gear pump, generally designated as 51. The gear pump 51 is equipped with a suction port 52, connected through passage 53, with schematically shown reservoir 54 and with a discharge port 55, connected through passages 56, 57 and 58 with the control section of the pump. The suction and discharge ports 52 and 55, of the gear pump 51, are functionally interconnected through a conventional relief valve 59.

A servo beam 60 is provided which has one end connected through a pin 61, an input plunger 62 and a connecting rod 63 to the trunnion 36. The opposite end of the servo beam 60 is connected through a slot 64 and a pin 65 to stem 66 of a servo valve 67. The servo valve 67 is guided in a bore 68, which bore 68 has circumscribing annular spaces 69 and 70. The spool end of the servo valve 67 is equipped with lands 71, 72 and 73, defining grooves 74, 75 and 76. The spool end of the servo valve 67 is equipped with a centrally located passage 77, functionally interconnecting grooves 74 and 76.

A pressure responsive pump control, generally designated as 78 is provided and equipped with a compensator spool 79, guided in bore 80. The compensator spool 79 has lands 81 and 82 defining therebetween a circular groove 83. The spool 79 also has an extension 84, slidably engaging reaction piston 85. A compensator spring 86 is interposed between the compensator spool 79 and the reaction piston 85. A through axial passage 87 connects space 88 within the reaction piston 85 and space 89 within the bore 80. A passage 90 functionally interconnects groove 83 with space 91 around piston 85. Passages 92 and 93 and restrictor orifice 94 functionally interconnect annular space 95 circumscribing bore 80 and space 91. Annular space 95 is connected by a passage 96 with space 97 at the end of bore 68. Passage 98 is provided which interconnects the space 91 and groove 76. The space 89 is connected through passage 99a, duct 25, and passage 48 to the high pressure timing port 46.

The pump is provided with an unloading valve, generally designated as 99, which is operated by solenoid 100. The valve includes a spool end (un-numbered) equipped with lands 101 and 102 guided in a bore 103. Bore 103 is provided with circumscribing annular spaces 104, 105, 106 and 107. Annular space 104 is connected through a passage 108 to annular space 69 and through passages 109 and 110 to bore 43. The annular space 105 is connected through passage 111 with groove 75 and through passages 58, 57 and 56 to the discharge port 55 of the gear pump 51. The space 106 is connected through a passage 112 to annular space 70 and through passages 113 and 114 to the bore 42. The annular space 107 is connected to groove 76 by passage 115 and to reservoir 54 by passage 116.

A gear pump unloading valve, generally designated as 117 is provided and has a spool 118 guided in a bore 119. The spool 118 is equipped with lands 120 and 121, defining therebetween a groove 122. The groove 122 is connected through passage 123 and 56 with the discharge port 55 of gear pump 51. The land 120 normally effectively blocks passage 124, leading to suction port 52 of gear pump 51.

The servo beam 60, at a point intermediate to its ends, is engaged by a pin 125, working in a slot 126 formed in the beam 60. The pin 125 is mounted on a lever 127 which is mounted to the pump housing 28 by a pin 130. The lever 127 is connected by a pin 128 to stem 129 of an input mechanism generally designated as 145. The stem 129 is provided with flanges 131 and 132 which engage spring plates 133 and 134, between which a spring 135 is interposed. The spring plates 133 and 134 engage stops and 137, provided in cylinder 138, which cylinder is guided in a bore 139, in respect to pump housing 28. The cylinder 138 is fastened to inner core of a push-pull cable 140, which core works in a reaction tube 141. At the opposite end the reaction tube 141 is suitably fastened, by bracket 142, to the tractor body. The opposite end of the push-pull cable 140 is fastened to diagrammatically shown gear shift lever 143, connected through mechanism 144 to gear shift mechanism of mechanical transmission, not shown.

Referring now to FIGURE 3, the basic components of FIGURE 2, modified to include forward and reverse zones of operation, are diagrammatically shown. Many of the components which are identical to those of FIGURE 2 are omitted, or shown only diagrammatically. The input mechanism, generally designated as 145, is identical in its performance to that described in FIGURE 2 and it functionally connects gear shift lever 143 with the servo beam 60. The servo beam 60 at one end is connected by a link 146 to the trunnion 36 and at the other end through slot 64 and pin 65 engages servo valve spool 147. The servo valve spool 147 is equipped with lands 148 and 149 and stems 150 and 151, defining annular grooves 152, 153 and 154. The servo valve spool 147 is guided in the bore 155 which has circumscribing annular spaces 156 and 157. The annular space 156 is connected through passage 158, annular space 159 and passage 144 to the bore 42. Annular space 157 is connected through passage 160, annular space 161 and passage 110 to the bore 43. The pump unloading valve 99 operated by the solenoid 100, is equipped with spool 162, having a reduced center portion or groove 163. The spool 162 is guided in bore 164. The solenoid 100 is connected through switch 165 to a battery 166. The switch 165 is opened and closed responsive to the position of clutch pedal 167. The servo valve spool 147 is operable through stems 168 and 169 of identical compensator overrides 170 and 171. The compensator override 170 is connected through passage 172 with pump port 46, which in turn is connected through duct 25 to the motor ports not shown. The compensator override 171 is connected by passage 173 to pump port 45 which in turn is connected through duct 26 with the fluid motor ports not shown. The high pressure port 55, of gear pump 51, communicates through passage 174, ducts 175 and 176, check valves 177 and 178 and ducts 179 and 180 with ducts 25 and 26.

Referring now to FIGURE 4, a typical compensator override 170 or 171, shown diagrammatically in FIGURE 3, is shown in detail. The compensator override includes a spool 181 equipped with lands 182 and 183, defining therebetween an annular groove 184. The spool 181 is guided in a bore 185, which terminates in space 186. The spool 181 is equipped with a cylindrical stem 187, slidably engaging bore 188, of a reaction cylinder 189, which bore 188 defines space 190. Spaces 186 and 190 are connected through axial passage 191. The reaction cylinder 189, contained within space 191a, abuts plug 192, secured in valve body 193. The annular groove 184 is connected to space 191a by passage 194. Compensator bore 185 is equipped with a port 195, which communicates through restrictor 196, through space 191a and through passage 197 with space 198, defined by bore 199. The bore 199 slidably engages force piston 200, attached to stem 169. A spring 201 is interposed between force piston 200 and a plug 202, secured in valve body 193 at one end of bore 199. Space 203 defined between plug 202 and force piston 200, through passages 204 and 205, is connected with space 191a and reservoir 54. Spring 206 is interposed between compensator spool 181 and reaction cylinder 189.

*Operation*

Referring now to FIGURE 2, the rotary motion, generated by the engine, not shown, is transmitted to the cylinder barrel 31 and induces reciprocation of pistons 33, which follow the reaction surface 35 of the trunnion 36. This reciprocating motion will induce a pumping action, and the pumped fluid is phased by the high pressure timing port 46 and low pressure timing port 45. The magnitude of flow, generated within cylinder barrel 31, is porportional to the angle of inclination of the reaction surface 35, in respect to axis of rotation of shaft 27. With the reaction surface 35, normal to the axis of rotation of the pump the flow becomes zero. With the maximum angle of inclination of the reaction surface 35, the pump volume output is at is maximum. The high pressure fluid, from high pressure timing port 46, is transmitted through passage 48 and duct 25 to the fluid motors 19. The flow of high pressure fluid will induce rotation in the fluid motors 19, this rotation being transmitted through the respective mechanical gear reductions 18 to the respective tractor front wheels 17. The high pressure fluid, after performing its work in the fluid motors 19, is exhausted, at low pressure level, through duct 26 and passage 47 to the low pressure timing port 45. The speed of rotation of the front wheels 17 is dictated by the surface speed of the tractor, which in turn is dictated by the speed of rotation of the rear wheels 15 is dictated by the selectable driving ratio of the mechanical transmission 16 and rotational speed of the engine 12. Assume that the angle of inclination of trunnion 36 and therefore flow output per revolution of the cylinder barrel 31, would be such, that at one specific ratio of the mechanical transmission, the fluid and mechanical drives would be maintained in the state of perfect synchronization. That means that peripheral speed of the steered wheels 17, driven by the fluid motors 19, would be the same as the peripheral speed of rear wheels 15 mechanically driven by the engine. From this condition, any increase or decrease of the engine speed of rotation will proportionally increase or decrease the flow output of the pump and therefore proportionally increase or decrease the peripheral speed of the steered wheels 17. Since the same increase or decrease in the rotational speed of the engine 12 will proportionally increase or decrease the peripheral speed of the rear wheels 15 for all engine speeds the fluid and mechanical drives theoretically will remain in a state of perfect synchronization. However, any change in the gear ratio, of the mechanical transmission, to maintain the synchronization must be followed by a corresponding change in angle of inclination of trunnion 36. Once the angle of inclination of trunnion 36 is changed, so the fluid and mechanical drives will become synchronized, for any selected gear ratio of the mechanical transmission this synchronization, as explained above, will be maintained at all engine r.p.m.

The angle of inclination of the trunnion 36 is regulated by pistons 40 and 41 which slidably engage bores 42 and 43, respectively. An admission of high pressure fluid to bore 42, when the bore 43 is connected to the lower pressure zone will induce an anticlockwise rotation of the trunnion 36, from the position as shown in FIGURE 2, gradually reducing the angular inclination of the reaction surface 35 and therefore flow out of the pump. Conversely, introduction of high pressure fluid to the bore 43 while the bore 42 is connected to the low pressure zone, will induce, through pistons 41 and 40, a clockwise rotation of trunnion 36 around trunnion pin 37, thus, effectively increasing the volume output of the pump. The rotary motion of the trunnion 36 is translated through connecting rod 63 into a proportional linear motion of input plunger 62. Therefore, the linear position of the input plunger 62 corresponds to the displacement of the variable pump. The input plunger is connected through pin 61 to the servo beam 60, which is connected through pin 125 to the input mechanism 145, transmitting to the servo beam 60 linear motion derived from the gear shift lever 143. Movement of the gear shift lever 143 will change the position of the servo beam 60 and therefore change the position of plunger 62. Movement of the servo beam by the action of the plunger 62 will be in a pivotal manner about pin 125 which will cause movement of valve stem 66 at any given setting of gear shift lever 143. Movement of servo beam 60 by lever 127 will act to move both the plunger 62 and the valve stem 66 to provide a new setting of the trunnion angle. Hence, these two linear inputs, i.e., from the plunger 62 and lever 127 are translated into linear motion of the servo valve stem 66. Movement of the valve stem 66 will effectively regulate the angular position of the trunnion 36 and therefore flow output of the pump by selectively diverting pressure fluid to bores 42 or 43 depending upon its direction of movement. The movement of the servo beam by the lever 127 will establish a maximum flow discharge for any given position of the gear shift as will be described presently. At any given setting of the gear shift the servo valve works through the servo beam as synchronizing means with respect to the gear shift to control the angular position of the trunnion responsive to variations in discharge pressure. The servo valve 67 is shown in FIGURE 2 in its neutral position, in which the lands 73 and 72 completely isolate annular spaces 69 and 70. Since annular space 69 is connected through passage 108 annular space 104 and passages 109 and 110 to bore 43 and annular space 70, through passage 112, annular space 106, passages 113 and 114 to bore 42, bores 43 and 42 are effectively blocked; and, therefore, through pistons 41 and 40 trunnion 36 will be maintained at its angle of inclination. Movement of the servo valve stem 66 downward, from the position shown in FIGURE 2, will connect space 69 with groove 74 which will be connected through passage 77 annular space 66 passage 115, annular space 107 and passage 116 to reservoir 54. Since annular space 69 is in turn connected to bore 43, bore 43 will therefore, through the above mentioned passages, be connected to the reservoir 54. At the same time, the downward motion of the servo valve stem 66 will connect annular space 70 with groove 75, which in turn is connected through passage 111, circular space 105 and passages 58, 57 and 56 to the discharge port 55 of gear pump 51. Since the annular space 70 is connected to the bore 42, the bore 42 will be connected to the high pressure source of the discharge port 55 of gear pump 51. This pressure is higher than the pressure in the reservoir 54 and the force unbalance, acting on the cross section area of the pistons 40 and 41, will rotate the trunnion 36 in an anticlockwise direction, moving through the connecting rod 63, the input plunger 62 in a downward direction. Servo beam 60 will revolve around the fulcrum of pin 125, which will move the servo valve stem 66 in an upward direction to the position as shown in FIGURE 2, thus effectively blocking bores 42 and 43 and maintaining the trunnion 36 at its new angular inclination.

Upward movement of the servo valve stem 66, from the position as shown in FIGURE 2 will connect, through passages already described, bore 42 with reservoir 54 and bore 43 with discharge port 55, of gear pump 51, thus causing a clockwise rotation of the trunnion 36. The rotation of the trunnion 36, in a manner as previously described, will move input plunger 62 upward, rotating the servo beam 60 around fulcrum of pin 125 and moving the servo valve stem 66 downward to a position as shown in FIGURE 2, where the bores 43 and 42 are blocked and trunnion is maintained at its new angular inclination.

Upward movement of pin 125 by movement of the gear shift lever will cause the servo beam 60 to rotate around the fulcrum of pin 61, which will move servo valve stem 66 upward. This upward movement of the valve stem 66 will result in clockwise rotation of trunnion 36, as previously described, which rotation through input plunger 62 and servo beam 60 will move the servo valve stem 66 to its neutral position, as shown in FIGURE 2, resulting in change of controlled angle of inclination of the trunnion 36. Therefore, with the control mechanism, as described above, upward or downward motion of the pin 125 will be translated into corresponding clockwise and anti-clockwise rotation of trunnion 36, each position of pin 125 corresponding to specific angle of inclination of the trunnion 36. Since the motion of gear shift lever 143 is translated through a well known action of push-pull cable 140 to the lever 127 and therefore to the pin 125 different specific positions of gear shift lever 143 will correspond to specific angles of inclination of trunnion 36. In this way, any particular position of the pin 125 and the corresponding gear ratio of mechanical transmission, as dictated by position of gear shift lever 143, will correspond to an exact angular inclination of the trunnion 36 and therefore exact specific displacement of the variable pump. Therefore, change in the gear ratio of the mechanical transmission, as signified by position of gear shift lever 143, will be translated into corresponding change in angle of inclination of the trunnion 36, thus synchronizing the displacement of the pump with the gear ratio of the mechanical transmission. The linkage of lever 127 to servo beam 60 and plunger 129 is selected to maintain a state of synchronization between the mechanical and fluid power transmission for each gear ratio.

The motion of the gear shift lever 143 to a new gear ratio position can be very rapid, while the reaction of the control resulting in the change in angular inclination of the trunnion may be slower; therefore a form of lost motion mechanism 145 is provided. Assume that momentarily the pin 128 and stem 129 will remain stationary, while under the action of the push-pull cable 140, the cylinder 138 is moved from right to left. The stop 137 will engage spring plate 134, moving it away from flange 132 and effectively compressing spring 135. The linear motion of the push-pull cable 140 is then stored in the mechanism 145, until pin 125 has moved upward and the spring plate 134 engaged the stop 137. In the same way movement of the cylinder 138 from left to right, with stem 129 remaining stationary, through stop 136 will move the spring plate 133 away from flange 131, effectively compressing spring 135. Downward movement of the pin 125 will expand 135 to a position as shown in FIGURE 2.

The mechanism for storage of the linear motion between the gear shift lever 143 and servo beam 60 is also necessary for correct action of the automatic pressure responsive pump control 78, which action is super-imposed upon displacement control by the gear shift lever 143, hereinabove described. This pressure responsive pump control 78 will transmit a control pressure signal above a certain predetermined pressure level to space 97. The space 89 communicating with the compensator spool 79 is connected through the passage 99a, duct 25 and passage 48 to the high pressure timing port 46. This pressure from the space 89 is transmitted through the centrally located passage 87, in compensator spool 79, to space 88. The cross-section area of the land 81 is larger than the cross-sectional area of the extension 84, thus generating a positive downward force equal to the product of the area difference and the pressure in the space 89.

This downward force is opposed by the preload in the compensator spring 86. Once the downward force overcomes the preload in the compensator spring 86, the compensator spool 79 will move downwardly, connecting the annular space 95 to high pressure fluid, contained within the space 89. This will cause the pressure in the space 97 to rise, tending to move servo valve stem 66 in a downward direction. Movement of the servo valve stem 66 in a downward direction will connect bore 42 with discharge port 55 of gear pump 51 and at the same time connect bore 43 to reservoir 54 as hereinbefore described. This will rotate the trunnion 36, in a manner as previously described, in an anti-clockwise direction. The resulting reduction in angle of inclination of trunnion 36 will effectively reduce the flow out of the pump and therefore pressure in the timing port 46 and space 89. Under action of the compensator spring 86 the compensator spool 79 will move upwardly to the position still further connecting circular groove 83 with annular space 95, as shown in FIGURE 2, thus effectively connecting the space 97 through passages 96 and 90, space 91, passage 98, groove 76, passage 115, annular space 107 and passage 116 to reservoir. Since the anti-clockwise rotation of the trunnion 36 and resulting motion of the input plunger 62 was stored in the spring 135, through the action of the servo beam 60, already described above, the trunnion 36 will be returned to its original angular inclination, corresponding to the specific position of the gear shift lever 143.

It should be noted that pressure responsive pump control 78 modulates the pressure in the space 97 in the following way. Downward motion of the compensator spool 79, while gradually connecting annular space 95 to high pressure fluid contained within the space 89 causes a gradual pressure build-up. The fluid under pressure from annular space 95 flows through the restrictor orifice 94 to space 91 and therefore to reservoir 54. Therefore, a gradual increase in the area of the communicating passage from space 89 to annular space 95, due to downward movement of the compensator spool 79 and corresponding flow into annular space 95, as balanced by the leakage through the restrictor orifice 94, will gradually increase the pressure in the space 97. The force generated by the pressure in space 97, acting on the cross-section of the servo valve 67, will gradually tend to compress the spring 135, reducing the angle of inclination of trunnion 36. Therefore, for any specific condition of equilibrium, as dictated by the position of gear shift lever 143, a gradual increase in discharge pressure of the pump above that equivalent to the preload in the compensator spring 86, will proportionally decrease the angular inclination of the trunnion 36 and therefore flow output of the pump. Since the reduction in the flow output of the pump corresponds with the decrease in the system pressure, the pump with the above control will automatically seek a displacement, smaller than that dictated by the position of gear shift lever 143, but equivalent to preload in the compensator spring 86. Therefore, although the position of gear shift lever 143 will automatically establish the maximum flow out of the pump, the pump will seek a flow position smaller than maximum, to maintain a pressure at its discharge port equivalent to preload in the compensator spring 86. For each specific gear ratio of the mechanical transmission the linkage to the servo beam is selected so that the maximum limit of pump flow is set slightly above that required for ideal synchronization. In this way the pressure responsive pump control will reduce the flow of the pump to maintain a constant pressure at the discharge port while preventing, during loss of traction at the front wheels, an increase in pump flow, above that as dictated by the position of the gear shift lever 143. Since different tractors do have a different gear shift pattern, a lost motion plate, well known in the art (not shown in FIGURE 2 but shown in FIGURE 3 and designated with reference number 207), may be provided between the push-pull cable and the gear shift lever 143.

In order to unload the pump, pump unloading valve 99, operated by solenoid 100, is provided. Motion of the valve downwardly will, to the position shown in dashed lines, connect annular space 104 with annular space 106 through annular space 105, thus effectively connecting bores 43 and 42. Under action of the piston return springs 34 the trunnion 36 will tend to assume its vertical position, equivalent to zero pump flow, freely transferring the fluid from the bore 43 to bore 42 through the passages opened by pump unloading valve 99. The solenoid 100 may be operably connected to the clutch pedal for actuation.

The gear pump unloading valve 117 is provided for unloading the gear pump 51. Movement of the spool 118, from the position as shown, will effectively connect discharge port 55 through passage 124 to suction port 52 and reservoir 54. Under these conditions the gear pump 51 is not capable of generating pressure.

Referring now to FIGURE 3, many of the basic components of the system controls of FIGURE 2 are shown diagrammatically, with some modifications to give a control system, capable of working in both forward and reverse driving ranges of the tractor. The construction and operation of the input mechanism 145, connected by push-pull cable 140 to gear shift lever 143, are identical to those as described when referring to FIGURE 2. A lost motion plate 207, generally referred to in previous description, but not shown in FIGURE 2, is diagrammatically shown in FIGURE 3. The operation of the servo beam 60, servo valve spool 147, pump unloading valve 99, gear pump unloading valve 117, gear pump 51, trunnion 36 and pistons 40 and 41 are identical in principle to that as described in FIGURE 2. The basic difference lies in the fact that the stems 150 and 151, of servo valve spool 147, protrude beyond the servo valve body and are in selective operational engagement with the stems 168 and 169 of compensator overrides 170 and 171. The compensator override 170 is connected through passage 172 to pump port 46, which in this case may be either a low pressure or high pressure pump port, as will be explained hereinafter. The compensator override 171 is connected through passage 173 with a low or high pressure pump port 45. Since the control system is intended for both forward and reverse driving ranges of the tractor, the angular rotation of the trunnion 36 will take place from maximum angular inclination in one direction, equivalent to maximum speed say in a forward driving range, through zero, equivalent to zero speed, to maximum in opposite direction, equivalent to maximum driving speed in the reverse speed range of the tractor. In a well known manner, change of the angular inclination of trunnion 36 through its zero flow position will reverse the direction of fluid flow through the pump and therefore reverse the polarity of the ports 46 and 45. With port 46 being the high pressure port, at a certain predetermined pressure level the compensator override 170, through stem 168, will tend to move servo valve spool 147 from left to right, resulting in anti-clockwise rotation of trunnion 36. Since this anti-clockwise rotation, by the very nature of the control, must be in direction of reduction of the angle of the trunnion 36 and therefore in direction of reduction of the pump flow, the maximum angular inclination of the trunnion 36, with port 46 pressurized, is when rotated clockwise. Conversely, with port 45 being the high pressure port, at a certain predetermined pressure level, the stem 169 of the compensator override 171 will move the servo valve spool 147 from right to left, connecting discharge port 55 of gear pump 51 with the bore 42 and reservoir 54 with bore 43, resulting in a clockwise rotation of the trunnion 36. This clockwise rotation again will be in direction of the reduction of the trunnion angle and therefore reduction in the pump flow. As previously described, when referring to FIGURE 2, from any specific point of equilibrium, as established by a specific angle of inclination of the trunnion and resulting in specific equivalent system pressure, any reduction in the trunnion angle and therefore the pump flow will automatically tend to lower the system pressure. Since lowering of the system pressure will be translated into change in position of stems 168 and 169, the above system, working on closed loop principle, will tend to seek its new point of equilibrium as dictated not by pump flow but by pump discharge pressure. In this way, through the action of compensator overrides the command of the system pressure will always be superimposed on the command of the system flow as selected by gear shift lever 143, always working in the direction of the reduction of the pump flow, to maintain the system pressure, as dictated by the setting of the compensator overrides 170 and 171.

Referring now to FIGURE 4, the compensator override 171 is shown in detail. (The construction and operation of override 170 is similar.) With the pump port 45 and therefore space 186 subjected to pressure, this pressure is transmitted through passage 191 to space 190, within the reaction cylinder 189. This fluid pressure generates opposing forces, acting on the cross-sectional area of land 183 and cylindrical stem 187. These cross-sectional areas are so selected that the small net force, opposing the action of the spring 206 is generated on compensator spool 181. Since this force is proportional to pressure generated in port 45, once the condition of equilibrium of the preload in the spring 206 and system pressure is reached, any further increase in the system pressure will tend to move the compensator spool 181 from right to left, against the force of spring 206. Therefore, depending on the system pressure and preload and force of the spring 206, each discharge pressure level over and above the condition of equilibrium will represent a specific position of compensator spool 181. Each of these specific positions represents a progressively increasing area of passage from space 186 to port 195. Since port 195 is connected through restrictor 196 with the space 191a, which in turn is connected through passage 204, space 203 and passage 205 to reservoir 54, in a well known manner, a condition of modulated pressure will exist in the port 195. This modulated pressure will be proportional to the position of the compensator spool 181, gradually increasing with the system pressure but at a much lower pressure level. From the position of equilibrium of the compensator spool 181, as shown in FIGURE 4, any reduction in system pressure in pump port 45, under action of the spring 206, will move the compensator spool 181 from left to right, connecting the port 195 to annular groove 184 and therefore through passage 194 to space 191a and therefore as previously described to reservoir 54. In this way the pressure in port 195, below discharge pressure levels, equivalent to preload in spring 206, will always be that of reservoir 54. At system pressures above the equilibrium condition, as shown in FIGURE 4, the pressure in the port 195 will gradually increase from reservoir pressure with the increase in the system pressure. The port 195, through passage 197, is connected to space 198, defined by bore 199. Force piston 200 biased by spring 201 is slidably guided in bore 199. With the port 195 and therefore space 198 connected to reservoir pressure, the force piston 200 will move under action of the spring 201 to its maximum retracted position, further motion being stopped by the compensator override housing. Any increase in the pressure in port 195 and therefore space 198 will generate force proportional to product of pressure and effective cross-section area of force piston 200, acting in direction opposing the biasing force of the spring 201. Therefore once the condition of equilibrium between those two forces is reached, any further increase in the pressure in the port 195 will result in a proportional movement of force piston 200 and stem 169. Therefore, in general, position of stem 169 will be proportional to system pressure over and above predetermined system pressure level as dictated by preload in the springs 206 and 201.

In general, the system as described, when referring to FIGURE 3, will maintain a preselected system pressure, both in forward and reverse driving ranges of the tractor, while providing a selected maximum flow of the pump for each particular gear ratio of the mechanical transmission. Since this maximum pump flow, for each particular gear ratio of the mechanical transmission, is so selected that, taking into account maximum permissible system leakage, caused by the working clearances and the effect of the temperature changes of the fluid the system synchronization may be still attained, the excess of pump flow during loss of traction at the front wheels becomes negligible. In this way not only is the system stability greatly improved but also excessive tire wear is virtually eliminated. The above system provides additional advantages over and above those already described by providing additional safety features. These result from the fact that with the gear shift lever 143 in neutral, the pump flow automatically is brought to zero, thus preventing the possibility of a run away tractor.

The solenoid operated pump unloading valve 99 is shown electrically connected through switch 165 to clutch pedal 167. On depressing clutch pedal 167 the solenoid 100 becomes energized, cross-connecting the bores 43 and 42 of pistons 41 and 40. Under action of the piston return spring couple 208, pump trunnion 36 is then automatically brought to zero flow position.

Still referring to FIGURE 3, the above described action of the compensator overrides 170 and 171 maintains system pressure at a predetermined level both in forward and reverse driving range of the tractor. The command pressure signal in this system as supplied by change in pressure will be superimposed on the command of the flow signal, as dictated by position of gear shift lever 143, the command of the flow signal automatically taking over once the system pressure drops below predetermined level. Therefore, the above described system in general works in the following way. The flow command of the pump is set at different flow levels, equivalent to specific gear ratios of mechanical transmission, zero pump flow being equivalent to neutral position of the gear shift lever. Because of the system leakage characteristics, which vary with pressure, temperature etc., these flow levels of the pump, equivalent to each gear ratio of the mechanical transmission, are selected slightly above the levels required for the complete synchronization of the fluid and mechanical drive systems. Then the automatic pressure responsive control is superimposed upon the action of the flow control in a priority system, which control will slightly reduce the pump flow setting, as dictated by the mechanical transmission ratio to the point of perfect synchronization. This automatic pressure responsive control will maintain fluid drive synchronized at a constant predetermined system pressure level and therefore constant predetermined level of drive torque output. Once sudden loss of traction, as reflected in the drop in the system pressure, the flow control of the pump takes over, limiting the maximum flow to that as dictated by the command of the mechanical gear ratio of the mechanical transmission.

It should be noted that although in the system hereinabove described the input mechanism 145 is connected to a gear shift lever, it can be connected to a suitable quadrant or other independent selector the ratios and flows equivalent to the mechanical transmission ratio being set by the operator, independent of the gear shift lever position, but equivalent to it. In this way the flow control setting, instead of being automatically translated from the position of the gear shift lever, is set through the feedback circuit of the operator. It should also be noted that the controlled system pressure levels, as dictated by the compensator springs 86 and 206 can be made adjustable, to facilitate the adaptation of the drive to specific physical conditions of the region in which the tractor is going to perform work, or even for specific crop or implement requirements worked by the tractor.

What is claimed is:

1. In a self-propelled vehicle having a frame, an engine and driving wheels mounted on said frame, transmission means interposed between said driving wheels and said engine, shift means disposed to change the driving ratio of said transmission means, and at least one steered wheel pivotally mounted on said frame, the combination therewith of a fluid power transmission and control system disposed to drive said steered wheel comprising, fluid motor means drivingly engaged with said steered wheel, a fluid pump disposed to drive said fluid motor means, displacement changing means to vary the flow of said pump, displacement control means arranged to move said displacement changing means to a plurality of selected control positions in response to a displacement control signal, pressure responsive control means arranged to vary the displacement changing means to maintain a relatively constant system pressure in repsonse to a system presure control signal, whereby said system pressure control signal is superimposed on said displacement control signal to maintain a relatively constant system pressure within the limit set by said displacement control means.

2. The combination of claim 1 wherein said tractor has gear shift means, and means to operate said displacement control means responsive to said shift means.

3. The combination of claim 2 wherein said displacement control means is configured to set zero pump displacement at the neutral position of the shift means.

4. The combination of claim 2 further characterized by said means to operate said displacement control means including synchronizing means disposed to maintain a selected relationship between the displacement of the pump and the driving ratio of the transmission means.

5. The combination of claim 4 wherein said synchronizing means includes linear signal storing means disposed to store a shift signal from said gear shift means until the reaction of the displacement control has taken place.

6. The combination of claim 4 further characterized by lost motion means interposed between said gear shift means and said synchronizing means, whereby a relationship between the displacement of the pump and the driving ratio of said transmission means is adaptable for different shift patterns of said gear shift means.

7. The combination of claim 1 wherein said displacement control means includes servo beam means and said pressure responsive control means is operably connected to said servo beam.

8. The combination of claim 7 wherein pressure responsive control means includes valve means operable responsive to change in the discharge pressure of said pump and operably connected to one end portion of said servo beam, the other end portion of said servo beam being operably connected to said displacement changing means of the pump, and said displacement control means including linkage means connected to said servo beam intermediate its end portions.

9. The combination of claim 8 wherein said valve means pivots said servo beam about its linkage connection to the displacement control means responsive to said pressure change, and said linkage connection pivots said servo beam about its connection to said displacement changing means responsive to change in settings of said displacement control means.

10. The combination of claim 1 wherein said pressure responsive control means includes fluid actuated piston means operably connected to said displacement changing means, and valve means operable responsive to the discharge pressure of said pump disposed to selectively admit and exhaust fluid pressure to said fluid actuated piston means.

11. The combination of claim 10 further characterized by separate fluid pump means connectable through said valve means to said fluid actuated piston means whereby to selectively supply pressure fluid thereto.

12. The combination of claim 1 further characterized by means to selectively unload said pump.

13. The combination of claim 12 wherein said tractor includes a clutch and said means to unload said pump is operably connected to and operable thereby.

14. In a self-propelled vehicle having a frame, an engine and driving wheels mounted on said frame, transmission means interposed between said driving wheels and said engine, shift means disposed to change the driving ratio of said transmissioin means, and at least one steered wheel pivotally mounted on said frame, the combination therewith of a fluid power transmission and control system disposed to drive said steered wheel comprising, fluid motor means in driving engagement with said steered wheels, a fluid pump disposed to drive said fluid motor means, displacement changing means to vary the flow of said pump, displacement control means arranged to move said displacement changing means to a plurality of selected maximum control positions in response to a displacement control signal, pressure responsive control means arranged to reduce the displacement of said displacement changing means to a lower level at a preselected discharge pressure and to vary the displacement changing means responsive to a system pressure control signal to maintain said preselected discharge pressure at flow levels below the maximum dictated by the selected setting of said displacement control means, whereby said system pressure control signal is superimposed on said displacement control signal to maintain a relatively constant system pressure within the maximum displacement set by said displacement control means.

15. The combination of claim 14 wherein said pressure responsive control means includes means to translate change in fluid discharge pressure to proportional change in displacement.

16. The combination of claim 14 wherein said pressure responsive control means includes fluid operated piston means operably connected to said displacement changing means, and valve means disposed to selectively supply pressure fluid to said fluid operated piston means.

17. The combination of claim 16 wherein said valve means includes a first valve spool operable by the discharge fluid pressure and moveable to admit pressure fluid to said fluid operated piston means when the discharge pressure varies from said preselected valve.

18. The combination of claim 17 wherein a separate pump is provided to supply pressure fluid for operation of said fluid operated piston means.

19. The combination of claim 17 further characterized by a servo beam having one end portion operably connected to said displacement changing means, a second valve spool operable responsive to movement of said first valve spool and operably connected to the other end portion of said servo beam, and linkage means operably connected to said servo beam intermediate its opposite end portions for moving the servo beam to set the control positions.

20. The combination of claim 19 further characterized by gear shift being operably connected to said linkage means and said linkage means including linear signal storing means to store a signal from said gear shift means until reaction of the displacement control has taken place.

21. The combination of claim 20 further characterized by said tractor having a clutch and means to unload said pump responsive to declutching the tractor.

22. The combination of claim 20 wherein said linkage is arranged to provide zero pump displacement when the gear shift means is in neutral.

23. The combination of claim 14 further characterized by actuation means to actuate said pressure responsive control means to operate in both directions of rotation of said pump.

24. The combination of claim 23 wherein said pump has two ports each a high pressure port in one direction of pump rotation, and said actuation means includes first and second actuators each responsive to one of said ports when the port is the high pressure port.

25. The combination of claim 24 wherein said pressure responsive control means includes first and second fluid operated piston means operably connected to said displacement changing means, and first valve means disposed to selectively supply pressure fluid to said first and second fluid operated piston means, and said actuators each having second pressure responsive valve means disposed to operate said first valve means responsive to discharge pressure change.

26. The combination of claim 25 characterized by a separate pump disposed to supply pressure fluid to said fluid operated piston means.

27. The combination of claim 23 wherein said tractor has gear shift means, and means to operate said displacement control means responsive to said shift means in forward and reverse directions.

28. The combination of claim 27 characterized by said tractor having a clutch, and means to unload said pump responsive to declutching said tractor.

29. The combination of claim 27 wherein said means to operate said displacement control means responsive to said shift means is arranged to move said displacement changing means to zero flow at the neutral position of said gear shift.

References Cited

UNITED STATES PATENTS

| | | | |
|---|---|---|---|
| 3,234,726 | 2/1966 | Hann | 60—19 |
| 3,272,276 | 9/1966 | Budzich | 180—66 X |
| 3,339,660 | 9/1967 | Budzich | 180—44 |

A. HARRY LEVY, Primary Examiner.

U.S. Cl. X.R.

60—52, 19, 53; 180—66